United States Patent
Moon et al.

(10) Patent No.: US 8,705,504 B2
(45) Date of Patent: Apr. 22, 2014

(54) APPARATUS AND METHOD FOR TRAFFIC OFFLOAD IN A BROADBAND WIRELESS ACCESS SYSTEM

(75) Inventors: Byoung-Chul Moon, Yongin-si (KR); Jake Lee, Seoul (KR); Sang-Heon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 13/149,135

(22) Filed: May 31, 2011

(65) Prior Publication Data

US 2011/0317585 A1    Dec. 29, 2011

(30) Foreign Application Priority Data

Jun. 25, 2010  (KR) .................. 10-2010-0060387

(51) Int. Cl.
*H04W 4/00* (2009.01)
*G06F 15/16* (2006.01)

(52) U.S. Cl.
USPC ............................ 370/338; 370/331; 709/203

(58) Field of Classification Search
None
See application file for complete search history.

(56) References Cited

U.S. PATENT DOCUMENTS

| | | | |
|---|---|---|---|
| 6,941,338 B1 | 9/2005 | Madsen | |
| 7,243,136 B2 * | 7/2007 | Huston et al. | 709/217 |
| 2007/0266091 A1 * | 11/2007 | Lin et al. | 709/204 |
| 2008/0310365 A1 | 12/2008 | Ergen et al. | |
| 2010/0057887 A1 | 3/2010 | Wang et al. | |
| 2010/0161729 A1 | 6/2010 | Leblanc et al. | |
| 2010/0232355 A1 * | 9/2010 | Richeson et al. | 370/328 |
| 2010/0281110 A1 * | 11/2010 | Phillips | 709/203 |
| 2011/0082946 A1 * | 4/2011 | Gopalakrishnan | 709/231 |
| 2011/0103358 A1 * | 5/2011 | Chandrasekaran | 370/338 |
| 2011/0153737 A1 * | 6/2011 | Chu et al. | 709/204 |

\* cited by examiner

*Primary Examiner* — Hassan Phillips
*Assistant Examiner* — Hicham Foud
(74) *Attorney, Agent, or Firm* — Jefferson IP Law, LLP (57) ABSTRACT

A method and apparatus, such as a pico service gateway, for reducing backhaul traffic in a broadband wireless access system are provided. The pico service gateway operatively receives an uplink packet including a contents request from a Mobile Station (MS). Upon receipt of the contents request, the pico service gateway determines whether the requested contents have been cached. If the pico service gateway determines that the contents have not been cached therein, the pico service gateway communicates with a corresponding server to receive the requested contents. Thereafter, the pico service gateway transmits the contents to the MS. Further, if the pico service gateway determines that the contents have not been cached, the pico service gateway caches the contents. In contrast, if the pico service gateway determines that the contents are cached therein, the pico service gateway transmits the contents corresponding to the requested contents.

32 Claims, 5 Drawing Sheets

APPARATUS AND METHOD FOR TRAFFIC OFFLOAD IN A BROADBAND WIRELESS ACCESS SYSTEM

PRIORITY

This application claims the benefit under 35 U.S.C. §119(a) of a Korean patent application filed in the Korean Intellectual Property Office on Jun. 25, 2010 and assigned Serial No. 10-2010-0060387, the entire disclosure of which is hereby incorporated by reference.

BACKGROUND OF THE INVENTION

1. Field of the Invention:

The present invention relate to a broadband wireless access system. More particularly, the present invention relates to reducing an amount of traffic in a broadband wireless access system.

2. Description of the Related Art:

The spread of high-performance portable terminals such as smart phones and the like brings about an increase of Web browsing and streaming services using mobile communication terminals. In order to cope with an associated increase of data traffic, ways for reducing the size of a Base Station (BS) cell to make the BS cell small or to consolidate a hot zone are being considered. Further, even a way for installing a pico BS having smaller output than a macro BS and providing high throughput and coverage, even within a large shopping mall, a theater, or an office building, is being taken into consideration.

One problem resulting from an increase of traffic is an increase in backhaul costs due to an increase of the number of BSs. That is, since a core network of a wireless access system is restricted in capacity, the extension of the core network is necessary to process a suddenly increasing traffic amount, and the extension of the core network incurs a high cost. Therefore, an alternative for reducing a traffic load of a core network is needed.

SUMMARY OF THE INVENTION

Aspects of the present invention are to address at least the above-mentioned problems and/or disadvantages and to provide at least the advantages below. Accordingly, an aspect of the present invention is to provide an apparatus and method for preventing an increase of a backhaul cost in a broadband wireless access system.

Another aspect of the present invention is to provide an apparatus and method for reducing backhaul traffic in a broadband wireless access system.

A further aspect of the present invention is to provide an apparatus and method for storing traffic at a core network front end in a broadband wireless access system.

Yet another aspect of the present invention is to provide an apparatus and method for allowing a public Internet network to share a user's Internet traffic in a broadband wireless access system.

The above aspects are addressed by providing an apparatus and method for traffic offload in a broadband wireless access system.

In accordance with an aspect of the present invention, a method for traffic processing in a wireless communication system is provided. The method includes receiving an uplink packet including a contents request from a Mobile Station (MS), determining whether the requested contents have been cached, if it is determined that the contents have not been cached, acquiring the contents from a corresponding server, transmitting the contents to the MS, and if it is determined that the contents have not been cached, caching the contents.

In accordance with another aspect of the present invention, an apparatus for traffic processing in a wireless communication system is provided. The apparatus includes a Base Station (BS) interface, a caching processor, a routing module, and a storage unit. The BS interface receives an uplink packet including a contents request from an MS. The caching processor determines whether the requested contents have been cached. The routing module acquires the contents from a corresponding server if the contents have not been cached. The storage unit caches the contents. The BS interface transmits the contents to the MS.

In accordance with a further aspect of the present invention, a wireless access system is provided. The system includes a core network, at least one BS, and a gateway. The core network includes a backhaul network of the wireless access system. The at least one BS performs communication with an MS through a wireless channel. The gateway is positioned at a junction between the at least one BS and the core network, and connects with the core network and a public Internet network. The gateway receives an uplink packet including a contents request from the MS, determines whether the requested contents have been cached, acquires the contents from a corresponding server if it is determined that the contents have not been cached, transmits the contents to the MS, and, if it is determined that the contents have not been cached, caches the contents.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technology for reducing backhaul traffic in a broadband wireless access system. In the exemplary embodiments of the present invention, an Orthogonal Frequency Division Multiplexing/Orthogonal Frequency Division Multiple Access (OFDM/OFDMA) wireless communication system is described by way of example.

Figure 1:
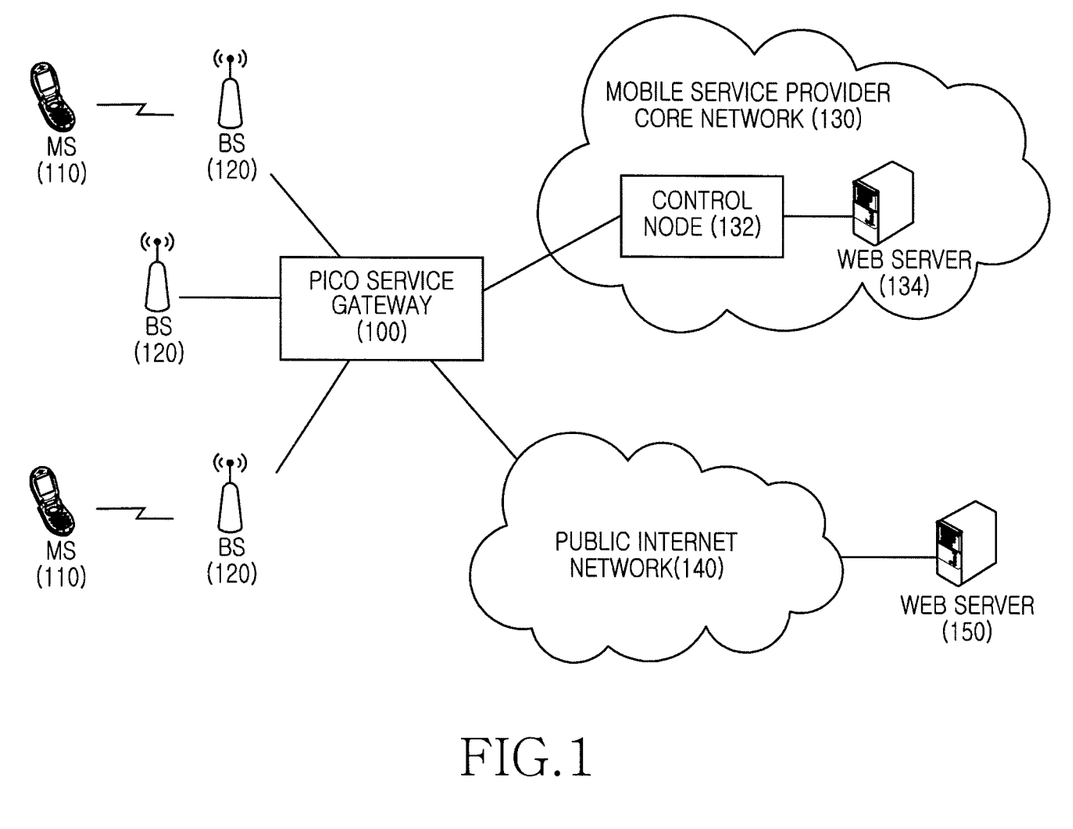
FIG. 1 is a schematic diagram illustrating a construction of a broadband wireless access system according to an exemplary embodiment of the present invention.

FIG. 1 illustrates a schematic construction of a broadband wireless access system according to an exemplary embodiment of the present invention.

Referring to FIG. 1, a plurality of Mobile Stations (MSs) 110 connect with a plurality of Base Stations (BSs) 120 through wireless channels, and the plurality of BSs 120 connect with a pico service gateway 100. For example, the plurality of BSs 120 can be either pico BSs installed in the same building or a group of BSs installed in a specific area. The pico service gateway 100 connects to each of a mobile service provider core network 130 and a public Internet network 140, and processes traffics of the plurality of MSs 110. The pico service gateway 100 is positioned at a junction between the plurality of BSs 120 and the mobile service provider core network 130. The mobile service provider core network 130 is a backhaul network of the broadband wireless access system. The mobile service provider core network 130 includes a control node 132 and a Web server 134. The control node 132 takes charge of traffic control, mobility management of an MS, authentication management, policy management, and the like. The Web server 134 provides a Web service specialized for the mobile service provider network. In FIG. 1, the control node 132 is illustrated as one entity, but this is merely for description convenience, and the control node 132 can comprise a plurality of entities divided per each function. The public Internet network 140 is a communication network used when an Internet service is used through a Personal Computer (PC) in a home, an office and the like, and a Web server 150 provides a Web service via the public Internet network 140.

The pico service gateway 100 analyzes packet data traffic received from the BSs 120 and, according to the analysis result, switches a traffic path between the mobile service provider core network 130 and the public Internet network 140. Further, the pico service gateway 100 performs a role of processing contents forwarded as downlink traffic, into a form optimized to the characteristic of the MSs 110. Further, the pico service gateway 100 performs a caching function for storing contents processed to be reused when there is a further need from a user or contents data before the processing. Furthermore, the pico service gateway 100 performs a role of a proxy server, thereby performing a role of a Transmission Control Protocol (TCP) connection end, i.e., an Internet Protocol (IP) end. Accordingly, a round-trip delay for a TCP connection of the MSs 110 is reduced, so TCP performance increases.

In the system construction of FIG. 1, the pico service gateway 100 is positioned at the junction between the plurality of BSs 120 and the mobile service provider core network 130 and public Internet network 140. According to another exemplary embodiment of the present invention, the pico service gateway 100 can be positioned in each of the BSs 120. In other words, a function of the pico service gateway 100 can be implemented by each of the plurality of BSs 120.

However, in a case where functions of contents processing, contents caching and the like are implemented by the pico service gateway 100 as illustrated in FIG. 1, there is an advantage that it is easy to acquire MS information, a contents reuse rate is relatively high, and it is easy to guarantee a storage space.

Figure 2:
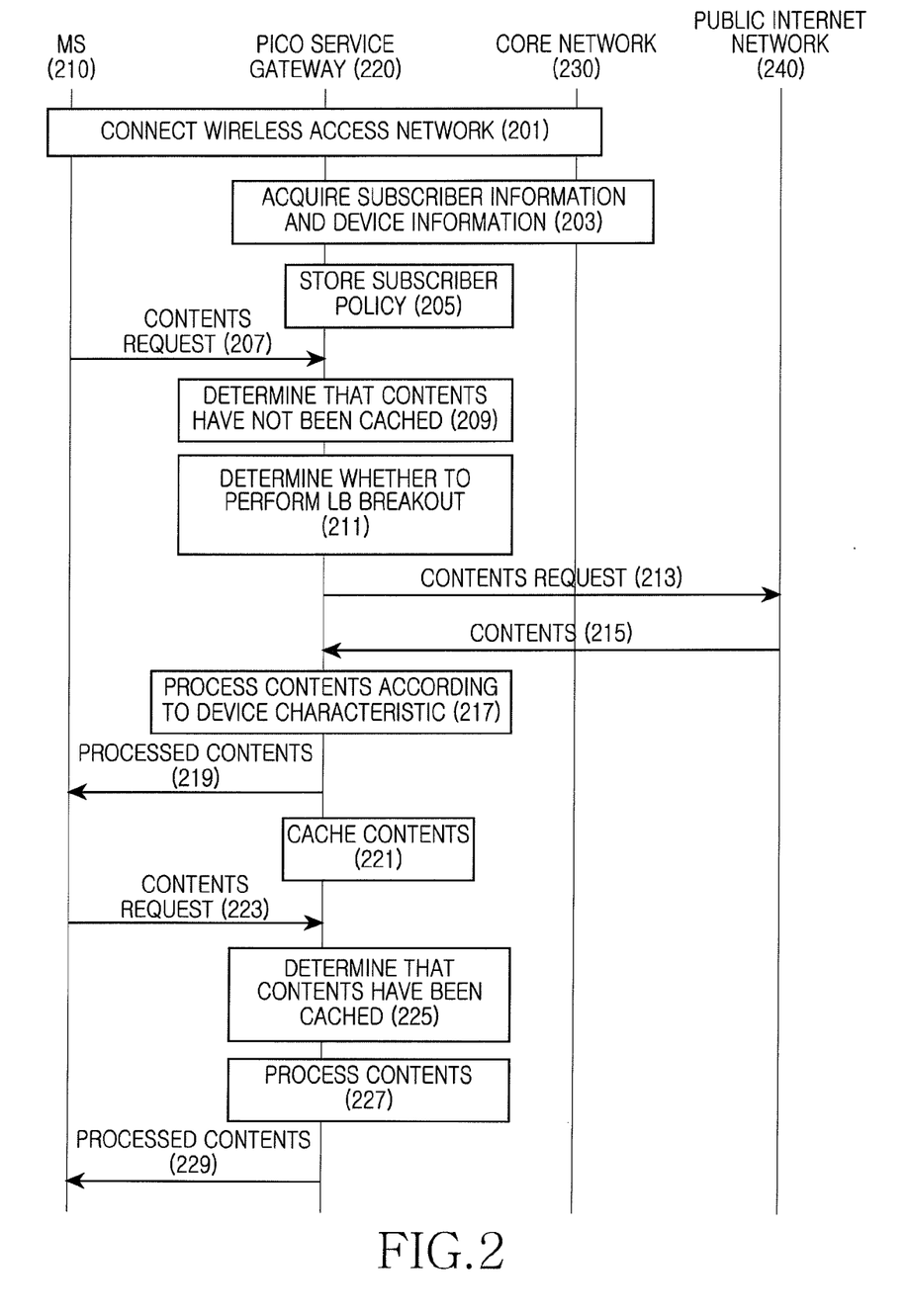
FIG. 2 is a ladder diagram illustrating a signal exchange using a Web service in a wireless access system according to an exemplary embodiment of the present invention.

FIG. 2 illustrates a signal exchange using a Web service in a wireless access system according to an exemplary embodiment of the present invention.

Referring to FIG. 2, in step 201, an MS 210 connects through a wireless access network via a BS subordinate to a pico service gateway 220. For example, by entering a cell of the BS by means of initial access or handover, the MS 210 connects the wireless access network via the pico service gateway 220.

In step 203, the pico service gateway 220 recognizing the access of the MS 210 acquires subscriber information and device information of the MS 210 from equipment of a core network 230. For example, the subscriber information and device information are provided from an authentication server, a policy server, and the like within the core network 230. Here, the subscriber information includes a service class for the MS 210, Quality of Service (QoS) information, and the like, and the device information includes a hardware characteristic of the MS 210, for example, a screen size, processing power, a storage capability, the kind and version of an Operating System (OS), and the like. However, according to another exemplary embodiment of the present invention, acquisition of the device information can be implemented at a contents request time point other than an access time point of the MS 210.

After receiving the subscriber information and device information, in step 205, the pico service gateway 220 stores the subscriber information and device information as subscriber policy information of the MS 210. In more detail, when transmitting/receiving traffic of the MS 210 through a public Internet network 240, the pico service gateway 220 should perform, as an IP end, functions of equipment within the core network 230, so the pico service gateway 220 stores information for operating as the IP end. Further, the pico service gateway 220 stores the device information in order to process contents provided to the MS 210 according to a device characteristic of the MS 210.

After that, in step 207, the MS 210 makes a request for contents. For example, the contents can include a Web page, an image, a video file, an audio file, a flash file, and the like. That is, the MS 210 transmits an uplink IP packet including the contents request. At this time, the MS 210 does not need to recognize the pico service gateway 220. In other words, the MS 210 may not recognize the existence of the pico service gateway 220.

In step 209, the pico service gateway 220 recognizes the contents request, determines whether the contents have been stored, and determines that the contents have not been stored. Accordingly, the pico service gateway 220 determines to receive the contents from a corresponding service server.

In step 211, the pico service gateway 220 determining to receive the contents determines whether to perform a Local Breakout (LB). Here, the local breakout represents a scheme of transmitting/receiving traffic through the public Internet network 240 other than the core network 230. In other words, the pico service gateway 220 determines whether to receive the contents through the core network 230 or through the public Internet network 240. At this time, selection of the core network 230 and the public Internet network 240, i.e., selection of a contents request path, is achieved in accordance with a position of a server providing a corresponding service, a QoS class of the MS 210, the kind of service, and the like. A detailed determination criterion can be different according to an exemplary embodiment of the present invention. At this time, the kind of service can be determined through a header of a packet transmitted from the MS 210. For example, in a case where a service requested by the MS 210 is a service unique to the wireless access system or in a case where the requested service is a security sensitive service such as a banking service, it is preferred that the contents are requested through the core network 230. Further, in a case where it is necessary to guarantee a stable throughput according to a service class of the MS 210, it is preferred that the contents are requested through the core network 230.

In step 213, the pico service gateway 220 determines to make a request for contents through the public Internet network 240, in other words, determines to perform local breakout, and transmits a contents request packet to a corresponding service server via the public Internet network 240. In step 215, the pico service gateway 220 receives the contents through the public Internet network 240.

In step 217, the pico service gateway 220 receiving the contents processes the contents according to the device characteristic of the MS 210. The contents processing is performed according to the subscriber policy information that was stored in step 205. In more detail, the pico service gateway 220 is aware of a screen size of the MS 210, processing power, and the like, and according to this, processes the contents. For example, the contents processing can be implemented according to the screen size of the MS 210, the kind and version of an OS, a wireless channel quality, QoS, a user class, and the like. For example, in a case of screen display contents such as an image file, a moving picture file and the like, the pico service gateway 220 controls a size of the image file and the like according to the screen size of the MS 210, thereby optimizing the size of data. Alternatively, in a case of a 3-Dimensional (3D) video requiring a lot of processing to play, a flash file, contents needing decompression, and the like, the pico service gateway 220 processes the contents into a form easy to play by performing some operations beforehand, thereby alleviating a processing amount load of the MS 210. However, the contents processing can be omitted when the contents processing is determined unnecessary according to the device characteristic of the MS 210.

After that, in step 219, the pico service gateway 220 transmits the processed contents to the MS 210. In step 221, the pico service gateway 220 caches the contents. At this time, the contents can be cached in the original state or in one of the processed states of step 217, or cached in the original state and all of the processed states. The cached contents are used for quickly responding to a further request of an MS, and can be deleted if a constant condition is met. For example, in a case where a constant time from a contents caching time point lapses, in a case where a constant time from the latest transmission time point lapses, or in a case where the constant time lapses and a hit rate is less than a threshold, corresponding contents can be deleted. Here, the hit rate can be counted with regard only to MSs accessing a BS that the pico service gateway 220 serves, or can be determined using information provided from a server providing corresponding contents.

Further, according to another exemplary embodiment of the present invention, even without a request for specific contents from an MS, the pico service gateway 220 can cache the specific contents beforehand. In more detail, the pico service gateway 220 can receive, from a corresponding service server, contents predicted to have a high hit rate through its own analysis result or through information provided from the corresponding service server, or contents determined on the basis of information input from a system operator, and cache the received contents beforehand.

After that, in step 223, the MS 210 makes a request for contents. For example, the contents can include a Web page, an image, a video file, an audio file, a flash file, and the like. At this time, the MS 210 does not need to recognize the pico service gateway 220, and the MS 210 uplink-transmits an IP packet including the contents request. In step 225, the pico service gateway 220 recognizes the contents request and determines whether contents have been cached, and determines that the contents have been cached. That is, the contents are one of the cached contents of step 221, contents cached according to a request of another MS, and contents cached without a request. Accordingly, in step 227, the pico service gateway 220 processes the contents cached without a request to a service server. At this time, the contents processing of step 227 can be omitted if the contents have been cached in a processed form. After that, in step 229, the pico service gateway 220 transmits the processed contents to the MS 210.

In the exemplary embodiment described with reference to FIG. 2, the pico service gateway 220 acquires subscriber information and device information, stores a subscriber policy, determines local breakout or non-breakout, processes contents, and caches the contents. According to another exemplary embodiment of the present invention, the above listed operations of the pico service gateway 220 can be carried out by a BS. In this case, a process of acquiring subscriber information and device information, storing a subscriber policy, determining local breakout or non-breakout, and processing and caching contents is the same, and an operating subject is merely changed to the BS. However, the BS performs the operations only for MSs accessing the BS.

An operation and construction of the pico service gateway performing the local breakout, the contents caching, and the like are described below in detail with reference to the accompanying drawings.

Figure 3A:
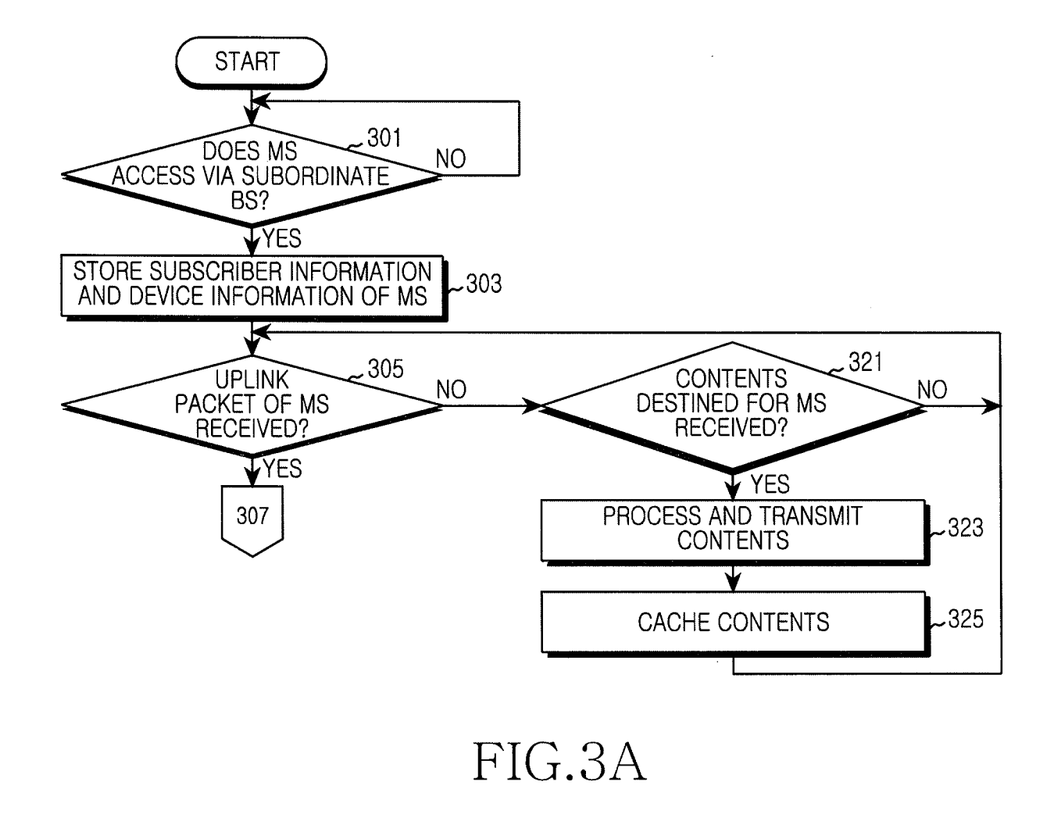
FIG. 3 is a flowchart illustrating an operation procedure of a pico service gateway in a wireless access system according to an exemplary embodiment of the present invention.
Figure 3B:
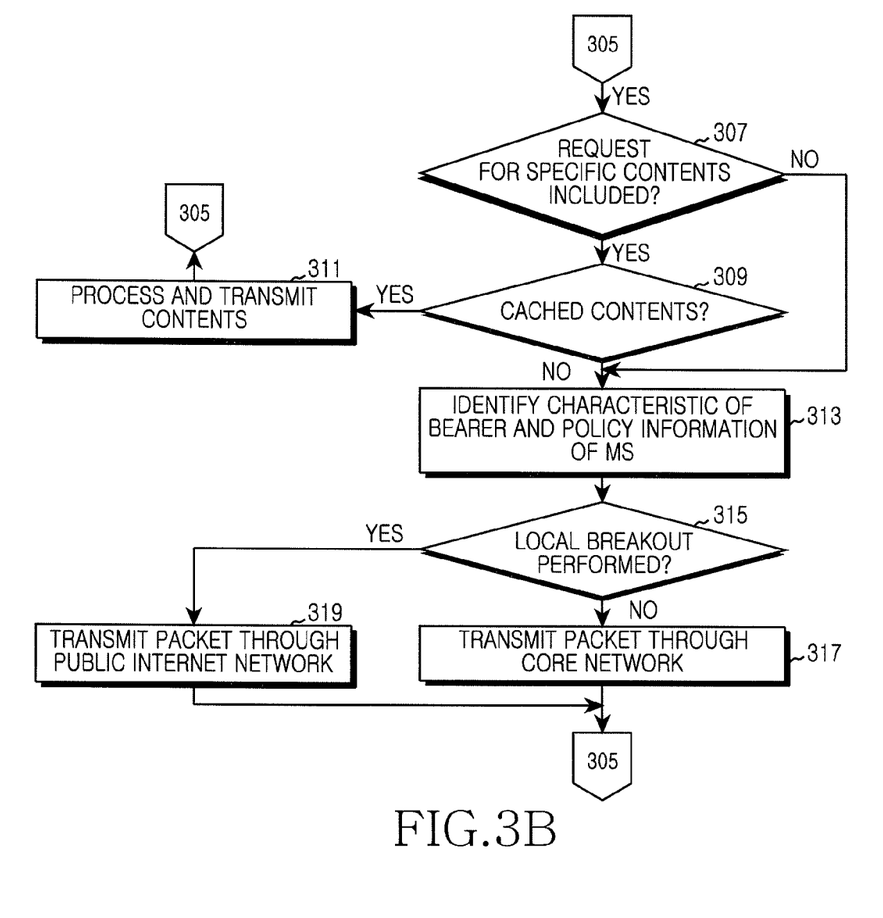

FIG. 3 illustrates an operation procedure of a pico service gateway in a wireless access system according to an exemplary embodiment of the present invention.

Referring to FIG. 3, in step 301, the pico service gateway determines whether an MS accesses a wireless access system via a subordinate BS. The pico service gateway connects with a plurality of BSs, and the pico service gateway receives uplink packets of MSs that access the BSs. For example, the plurality of BSs can be pico BSs installed in the same building, or a group of BSs installed in a specific area.

If the MS accesses the wireless access system, in step 303, the pico service gateway stores subscriber information and device information of the MS. That is, the pico service gateway performs communication with equipment within a core network of the wireless access system, for example, with an authentication server, a policy server, and the like to acquire the subscriber information and the device information, and stores the acquired subscriber information and device information as subscriber policy information of the MS. Here, the subscriber information can include a service class for the MS, QoS information, and the like, and the device information can include a hardware characteristic of the MS, for example, a screen size, processing power, and the like. However, the acquiring of the device information can be implemented at a contents request time point other than an MS access time point according to another exemplary embodiment of the present invention.

After that, in step 305, the pico service gateway determines whether an uplink packet of the MS is received. That is, the pico service gateway operates as an IP end for the MSs accessing the subordinate BSs. So, an uplink IP packet of the MS is transmitted to the core network and a public Internet network via the pico service gateway, and a downlink IP packet of the MS is transmitted to the MS via the pico service gateway.

If the uplink packet is received, in step 307, the pico service gateway determines whether the received packet includes a request for specific contents. For example, the contents can include a Web page, an image, a video file, an audio file, a flash file, and the like. That is, the uplink packet, which is an IP packet, can include data transmitted to a destination or information making a request for specific contents.

If the request for the specific contents is included in the received packet, in step 309, the pico service gateway determines if the requested contents have been cached. That is, the pico service gateway caches contents according to a predefined rule and, in response to a request of an MS, the pico service gateway transmits the cached contents to the MS. In other words, the pico service gateway determines whether the requested contents are contents that have been cached by a caching function.

If the requested contents have been cached, in step 311, the pico service gateway transmits the cached contents to the MS. In more detail, the pico service gateway transmits the cached contents instead of forwarding a contents request to a corresponding service server. Accordingly, the pico service gateway disregards the uplink packet because the uplink packet has no need to be forwarded. At this time, the pico service gateway can process the contents according to the stored device information of step 303 and then, transmit the processed contents. For example, in a case of screen display contents, the pico service gateway adjusts the size of an image file and the like according to a screen size of the MS. Alternatively, in a case of contents requiring a lot of processing for play, the pico service gateway processes the contents into a form easy to play by performing some operations beforehand. However, the contents processing can be omitted when the contents processing is determined to be unnecessary according to a device characteristic of the MS or when the contents have been cached in a processed state.

In contrast, if it is determined in step 309 that the requested contents have not been cached or if it is determined in step 307 that the requested contents do not include the request for specific contents, the pico service gateway proceeds to step 313 and determines a characteristic of a bearer corresponding to the uplink packet, and subscriber policy information of the MS. In other words, the pico service gateway determines information for determining performance or non-performance of local breakout. For example, the characteristic of the bearer is determined through a header of the uplink packet, and can include a QoS of the bearer, the kind of service, a position of a server providing a corresponding service, and the like. Here, the header includes a header of an IP packet, a header of a mobile communication network, and the like.

Then, the pico service gateway proceeds to step 315 and determines performance or non-performance of local breakout. Here, the local breakout represents a scheme of transmitting/receiving traffic through the public Internet network other than the core network. In more detail, the pico service gateway determines whether to transmit the uplink packet through the core network or to transmit through the public Internet network. That is, the pico service gateway determines an uplink packet transmission path among the core network and the public Internet network. At this time, the determination of the local breakout is achieved in accordance with a position of a server providing a corresponding service, a QoS class of the MS, the kind of service, and the like. A detailed determination criterion can be different according to an exemplary embodiment of the present invention. For example, in a case where a service requested by the MS is a service unique to the wireless access system, in a case where the requested service is a security sensitive service such as a banking service, or in a case where it is necessary to guarantee a stable throughput according to a service class of the MS, it is preferred that the uplink packet is requested through the core network.

If the pico service gateway determines not to perform the local breakout in step 315, the pico service gateway proceeds to step 317 and transmits the uplink packet through the core network. In contrast, if the pico service gateway determines to perform the local breakout in step 315, the pico service gateway proceeds to step 319 and transmits the uplink packet through the public Internet network. After that, the pico service gateway returns to step 305.

If it is determined in step 305 that the uplink packet of the MS is not received, in step 321, the pico service gateway determines whether contents destined for the MS via the core network or the public Internet network are received. For example, the contents can include a Web page, an image, a video file, an audio file, a flash file, and the like.

If it is determined in step 321 that the contents destined for the MS are received, the pico service gateway proceeds to step 323 and transmits the received contents to the MS. At this time, the pico service gateway can process the contents according to the stored device information of step 303 and then transmit the processed contents. For example, in a case of screen display contents, the pico service gateway can adjust the size of an image file and the like according to a screen size of the MS. Alternatively, in a case of contents requiring a lot of processing for play, the pico service gateway processes the contents into a form easy to play by performing some operations beforehand. However, the contents processing can be omitted when the contents processing is determined to be unnecessary according to a device characteristic of the MS.

Then, the pico service gateway proceeds to step 325 and caches the contents. The contents can be cached in the original state or in one of the processed states, or cached in the original state and all of the processed states. The cached contents are used for quickly responding to a further request of an MS, and can be deleted if a constant condition is met. For example, in a case where a constant time from a contents caching time point lapses, in a case where a constant time from the latest transmission time point lapses, or in a case where the constant time lapses and a hit rate is less than a threshold, corresponding contents can be deleted. Here, the hit rate can be counted up with regard only to MSs accessing a BS that the pico service gateway serves, or can be determined using information provided from a server providing corresponding contents.

Further, although not illustrated in FIG. 3, according to another exemplary embodiment of the present invention, even without a request for specific contents from an MS, the pico service gateway can cache the specific contents beforehand. In more detail, the pico service gateway can receive, from a corresponding service server, contents predicted to have a high hit rate through its own analysis result or through information provided from the corresponding service server, or contents determined on the basis of information input from a system operator, and cache the received contents beforehand.

As described above, the pico service gateway can perform the procedure of FIG. 3. However, the procedure of FIG. 3 can be implemented by a BS other than the pico service gateway according to another exemplary embodiment of the present invention. In this case, the BS determines in step 301 whether an MS accesses a wireless access system via the BS itself.

Figure 4:
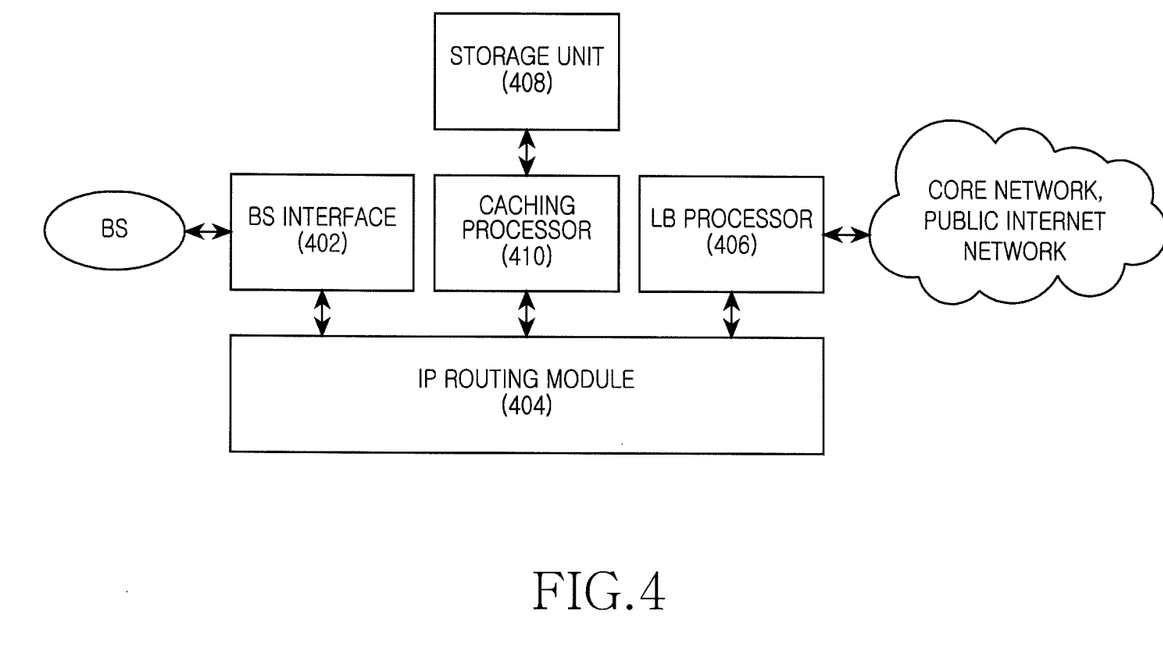
FIG. 4 is a block diagram illustrating a construction of a pico service gateway in a wireless access system according to an exemplary embodiment of the present invention.

FIG. 4 illustrates a construction of a pico service gateway in a wireless access system according to an exemplary embodiment of the present invention.

Referring to FIG. 4, the pico service gateway includes a BS interface 402, an IP routing module 404, a Local Breakout (LB) processor 406, a storage unit 408, and a caching processor 410.

The BS interface 402 provides an interface for performing communication with subordinate BSs. That is, the BS interface 402 analyzes a packet of an uplink mobile communication network to extract an uplink IP packet, and generates a packet of a downlink mobile communication network including a downlink IP packet.

The IP routing module 404 supports connections to networks having different subnets, i.e., a core network and a public Internet network of the wireless access system. That is, the IP routing module 404 allows the pico service gateway to operate as an IP end of MSs accessing the subordinate BSs. According to determination of the LB processor 406, the IP routing module 404 transmits an uplink IP packet provided from the BS interface 402, to the core network or the public Internet network. The IP routing module 404 forwards an uplink packet to the LB processor 406 or disregards the uplink packet, depending on the control of the caching processor 410.

The LB processor 406 determines performance or non-performance of local breakout, depending on a characteristic of a bearer of an MS and subscriber policy information. If an uplink packet to be transmitted from the IP routing module 404 is provided, the LB processor 406 determines the characteristic of the bearer corresponding to the uplink packet and the subscriber policy information stored in the storage unit 408. For example, the characteristic of the bearer is determined through a header of the uplink packet, and can include a QoS of the bearer, the kind of service, a position of a server providing a corresponding service, and the like. Here, the header can include a header of an IP packet, a header of a mobile communication network, and the like. The LB processor 406 determines the performance or non-performance of the local breakout, in accordance with the position of the server providing the corresponding service, a QoS class of the MS, the kind of service, and the like. For example, in a case where a service requested by the MS is a service unique to the wireless access system, in a case where the requested service is a security sensitive service, or in a case where it is necessary to guarantee a stable throughput according to a service class of the MS, it is preferred that the uplink packet is requested through the core network.

The storage unit 408 stores a program used for an operation of the pico service gateway, a microcode, temporary data, setting information, and the like. Particularly, the storage unit 408 stores subscriber policy information on MSs accessing subordinate BSs that the pico service gateway serves. That is, if an MS accesses a network through the pico service gateway, the storage unit 408 stores subscriber information and device information of the MS acquired from equipments within the core network of the wireless access system, for example, from an authentication server, a policy server, and the like. Here, the subscriber information can include a service class for the MS, QoS information, and the like, and the device information can include a hardware characteristic of the MS, for example, a screen size, processing power, and the like. The storage unit 408 caches contents provided from the caching processor 410.

The caching processor 410 performs a contents caching function and a contents processing function. In more detail, if an uplink packet of an MS including a request for specific contents is received, the caching processor 410 determines whether the requested contents have been cached in the storage unit 408. If it is determined that the requested contents have been cached in the storage unit 408, the caching processor 410 controls the IP routing module 404 to disregard the uplink packet, and controls the BS interface 402 to transmit the cached contents to the MS. In contrast, if it is determined that the requested contents have not been cached, the caching processor 410 controls the IP routing module 404 to transmit the uplink packet. After that, in a case where contents destined for the MS are provided from the IP routing module 404, the caching processor 410 controls the BS interface 402 to transmit the contents to the MS. In a case of transmitting, to the MS, the contents cached in the storage unit 408 or the contents provided from the IP routing module 404, the caching processor 410 can process the contents depending on the device information stored in the storage unit 408. However, the contents processing can be omitted when the contents processing is determined to be unnecessary according to a device characteristic of the MS or when the contents have been cached in a processed state.

Further, in a case of transmitting, to the MS, the contents provided from the IP routing module 404, the caching processor 410 caches the contents in the storage unit 408. At this time, the contents can be cached in the original state or one of the processed states, or cached in the original state and all of the processed states. The cached contents are used for quickly responding to a further request of the MS, and can be deleted if a constant condition is met. For example, in a case where a constant time from a contents caching time point lapses, in a case where a constant time from the latest transmission time point lapses, or in a case where the constant time lapses and a hit rate is less than a threshold, corresponding contents can be deleted. Here, the hit rate can be counted up with regard only to MSs accessing a BS that the pico service gateway serves, or can be determined using information provided from a server providing corresponding contents. Further, according to another exemplary embodiment of the present invention, even without a request for specific contents from an MS, the caching processor 410 can cache the specific contents beforehand. In more detail, the caching processor 410 can receive, from a corresponding service server, contents predicted to have a high hit rate through its own analysis result or through information provided from the corresponding service server, or contents determined on the basis of information input from a system operator, and cache the received contents beforehand.

As above, the pico service gateway can be constructed as illustrated in FIG. 4. Unlike this, according to another exemplary embodiment of the present invention, the construction of FIG. 4 can be applied to a BS other than the pico service gateway. In this case, the BS interface 402 can be replaced with a wireless communication unit for performing communication with an MS through a wireless channel. For example, the wireless communication unit can include a block for processing a Radio Frequency (RF) signal, a modulator/demodulator (modem) for modulating/demodulating and coding/decoding a signal according to a communication standard, and the like.

As described above, exemplary embodiments of the present invention can save a system operation cost and reduce a load of a core network, by decreasing backhaul traffic of a system through traffic caching and traffic dispersion to a public Internet network in a broadband wireless access system. Further, due to caching, data is provided from a server relatively near to a user, so a data forwarding time can be short and a service quality felt by the user can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for traffic processing in a wireless communication system, the method comprising:
   receiving an uplink packet comprising a contents request from a Mobile Station (MS);
   determining whether the requested contents have been cached;
   if it is determined that the contents have been cached, transmitting the contents to the MS;
   if it is determined that the contents have not been cached,
      determining a content acquisition path according to whether to acquire the contents from a core network over a first connection or a public Internet network over a second connection, according to at least one of the subscriber information and the device information;
      acquiring the contents from a corresponding server using the content acquisition path;
      transmitting the contents to the MS; and
      caching the contents,
   wherein the first connection and the second connection are operatively parallel such that communication with the core network over the first connection does not require communication over the second connection, and communication with the public Internet network over the second connection does not require communication over the first connection.

2. The method of claim 1, further comprising:
   acquiring at least one of subscriber information and device information of the MS.

3. The method of claim 2, wherein the subscriber information comprises at least one of a service class for the MS and Quality of Service (QoS) information, and
   wherein the device information comprises at least one of a screen size of the MS, a processing power, a storage capacity, and a kind and version of an Operating System (OS).

4. The method of claim 2, wherein the content acquisition path corresponds to an uplink packet transmission path over which the contents are acquired, and
   wherein the acquiring of the contents from the corresponding server using the content acquisition path comprises:
   transmitting the uplink packet through the determined path; and
   receiving the contents from the corresponding server.

5. The method of claim 4, wherein the uplink packet transmission path is determined in accordance with at least one of a position of a server providing a corresponding service, a service class of the MS transmitting the uplink packet, a QoS of a bearer, and a kind of service.

6. The method of claim 5, wherein the determining of the uplink packet transmission path comprises determining the uplink packet transmission path as the core network if it is determined that a service to which the uplink packet corresponds comprises a service unique to a wireless access system, if it is determined that the service is a security sensitive service, or if it is determined that it is necessary to guarantee a stable throughput depending on the service class of the MS transmitting the uplink packet.

7. The method of claim 2, further comprising:
   prior to transmitting the contents to the MS, processing the contents according to a device characteristic of the MS.

8. The method of claim 7, wherein the processing of the contents comprises adjusting a display size of the contents according to a screen size of the MS.

9. The method of claim 7, wherein the processing of the contents comprises performing at least one operation used for playing the contents.

10. The method of claim 7, wherein the caching of the contents comprises storing the contents in a form of at least one of an original state and a processed state.

11. The method of claim 1, further comprising:
    deleting the contents if it is determined that a constant time from a contents caching time point lapses, if it is determined that a constant time from a latest contents transmission time point lapses, or if it is determined that a constant time lapses and a hit rate is less than a threshold.

12. The method of claim 1, wherein the core network corresponds to a mobile service provider core network comprising a control node and a web server, and
    wherein the public internet network comprises at least one web server.

13. The method of claim 1, wherein the determining of the content acquisition path is performed by at least one of:
    a pico service gateway operatively disposed at a junction comprising a connections to a plurality of base stations, a connection to the core network, and a connection to the public Internet network, and
    a base station disposed at a junction comprising connections to a plurality of MSs, a connection to the core network, and a connection to the public Internet network.

14. An apparatus for traffic processing in a wireless communication system, the apparatus comprising:
    an interface for receiving an uplink packet comprising a contents request from a Mobile Station (MS);
    a caching processor for determining whether the requested contents have been cached;
    a Local Breakout (LB) processor for determining a content acquisition path according to whether to acquire the contents from a core network over a first connection or a public Internet network over a second connection according to at least one of the subscriber information and the device information;

a routing module for, if it is determined that the contents have not been cached, acquiring the contents from a corresponding server using the content acquisition path; and a storage unit for, if it is determined that the contents have not been cached, caching the contents, wherein the interface transmits the contents to the MS, and wherein the first connection and the second connection are operatively parallel such that communication with the core network over the first connection does not require communication over the second connection, and communication with the public Internet network over the second connection does not require communication over the first connection.

15. The apparatus of claim 14, wherein the storage unit stores at least one of subscriber information and device information of the MS.

16. The apparatus of claim 15,
wherein the subscriber information comprises at least one of a service class for the MS and Quality of Service (QoS) information, and
wherein the device information comprises at least one of a screen size of the MS, a processing power, a storage capacity, and a kind and version of an Operating System (OS).

17. The apparatus of claim 15, wherein the content acquisition path corresponds to an uplink packet transmission path over which the routing module acquires the contents from the corresponding server,
wherein the routing module transmits the uplink packet through the determined path, and receives the contents from the corresponding server.

18. The apparatus of claim 17, wherein the uplink packet transmission path is determined in accordance with at least one of a position of a server providing a corresponding service, a service class of the MS transmitting the uplink packet, a QoS of a bearer, and a kind of service.

19. The apparatus of claim 18, wherein the LB processor determines the uplink packet transmission path as the core network if it is determined that a service to which the uplink packet corresponds comprises a service unique to a wireless access system, if it is determined that the service is a security sensitive service, or if it is determined that it is necessary to guarantee a stable throughput depending on the service class of the MS transmitting the uplink packet.

20. The apparatus of claim 15, wherein, prior to transmitting the contents to the MS, the caching processor processes the contents according to a device characteristic of the MS.

21. The apparatus of claim 20, wherein the caching processor adjusts a display size of the contents according to a screen size of the MS.

22. The apparatus of claim 20, wherein the caching processor performs at least one operation used for playing the contents.

23. The apparatus of claim 20, wherein the storage unit stores the contents in a form of at least one of an original state and a processed state.

24. The apparatus of claim 14, wherein the storage unit deletes the contents if it is determined that a constant time from a contents caching time point lapses, if it is determined that a constant time from the latest contents transmission time point lapses, or if it is determined that a constant time lapses and a hit rate is less than a threshold.

25. The apparatus of claim 14, wherein the core network corresponds to a mobile service provider core network comprising a control node and a web server, and wherein the public internet network comprises at least one web server.

26. The apparatus of claim 14, wherein the apparatus is disposed at one of:
a junction comprising connections to a plurality of base stations, a connection to the core network, and a connection to the public Internet network; and
a junction comprising connections to a plurality of MSs, a connection to the core network, and a connection to the public Internet network.

27. A wireless access system, the system comprising:
a core network comprising a backhaul network of the wireless access system;
at least one Base Station (BS) performing communication with a Mobile Station (MS) through a wireless channel; and
a gateway, positioned at a junction so as to comprise a connection to the at least one BS, a connection to the core network, and a connection to a public Internet network,
wherein the gateway receives an uplink packet comprising a contents request from the MS, determines whether the requested contents have been cached, determines a content acquisition path according to whether to acquire the contents from the core network or the public Internet network according to at least one of the subscriber information and the device information if it is determined that the contents have not been cached, acquires the contents from a corresponding server using the content acquisition path if it is determined that the contents have not been cached, transmits the contents to the MS, and caches the contents if it is determined that the contents have not been cached, and
wherein the connection between the gateway and the core network is operatively parallel to the connection between the gateway and the public Internet network such that communication between the gateway and the core network does not require communication with public Internet network, and communication between the gateway and the public Internet network does not require communication with the core network.

28. The system of claim 27, wherein the gateway performs a role of a proxy server to perform a role of a Transmission Control Protocol (TCP) connection end and an Internet Protocol (IP) end.

29. The system of claim 27, wherein the gateway acquires at least one of subscriber information and device information of the MS.

30. The system of claim 29, wherein the content acquisition path corresponds to an uplink packet transmission path over which the contents are acquired, and
wherein the gateway transmits the uplink packet through the determined path, and receives the contents from the corresponding server.

31. The system of claim 29, wherein, prior to transmitting the contents to the MS, the gateway processes the contents according to a device characteristic of the MS.

32. The system of claim 27, wherein the core network corresponds to a mobile service provider core network comprising a control node and a web server, and
wherein the public internet network comprises at least one web server.

* * * * *